S. ALLAND.
SHAVING SET.
APPLICATION FILED OCT. 12, 1918.
1,298,633.
Patented Apr. 1, 1919.
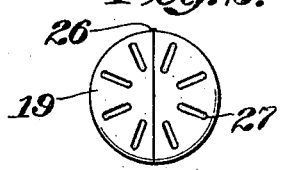
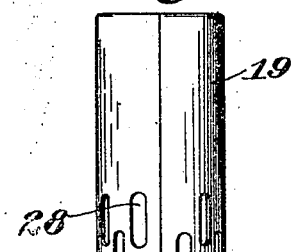
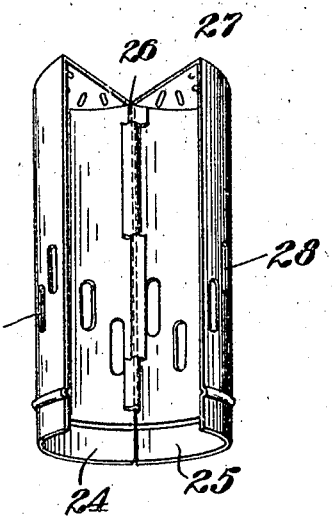
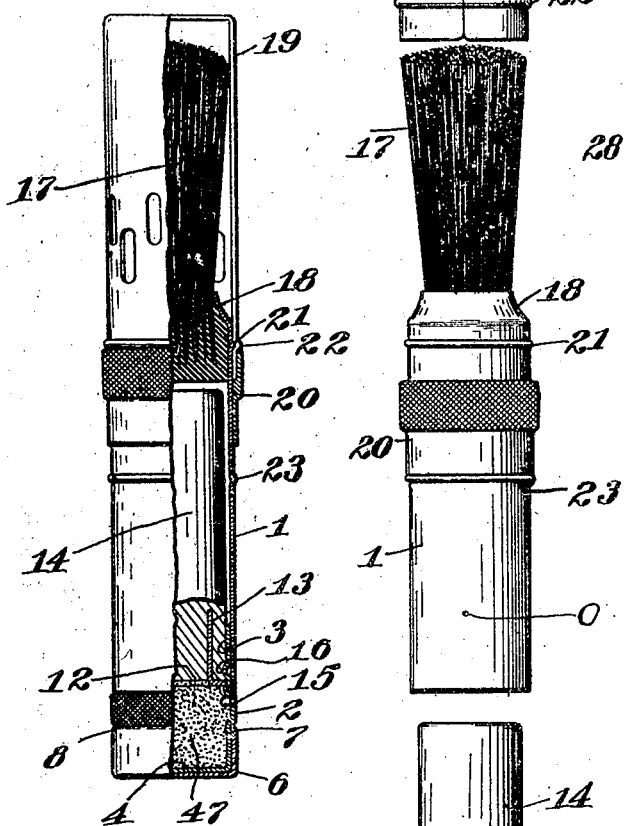
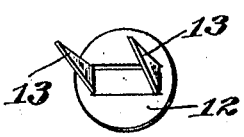
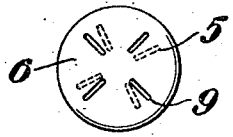
Inventor
Samuil Alland
by Roberts Roberts & Cushman
his Attorneys

UNITED STATES PATENT OFFICE.

SAMUIL ALLAND, OF BOSTON, MASSACHUSETTS.

SHAVING SET.

1,298,633.  Specification of Letters Patent.  Patented Apr. 1, 1919.

Application filed October 12, 1918. Serial No. 257,837.

*To all whom it may concern:*

Be it known that I, SAMUIL ALLAND, citizen of the United States, and resident of Boston, in the county of Suffolk and State of Massachusetts, have invented new and useful Improvements in Shaving Sets, of which the following is a specification.

This invention relates to a shaving set and has for its object to provide a compact article which may be quickly and easily assembled and disassembled, which will occupy a small space when assembled, which can be manufactured at a comparatively small cost, and which makes provision in a single article for a stick of shaving soap and talcum powder and if desired for a shaving brush.

Other objects of the invention will be apparent from the following description and the accompanying drawings in which—

Figure 1 is in part an elevation and in part a central longitudinal section of the device in assembled form;

Fig. 2 is a top view of the device;

Fig. 3 is a bottom view of the device;

Fig. 4 is a side elevation of the device, with the parts in detached relationship;

Fig. 5 is a perspective view of the brush housing in open position; and

Fig. 6 is a perspective view of a partition.

The particular embodiment of the invention chosen for the purpose of illustration comprises a tubular casing 1 and a second tubular casing 2 having a portion 3 of reduced diameter adapted to telescope snugly into the tubular casing 1. The casing 2 is closed at its lower end 4, and the closed end is provided with a plurality of radial slots 5 through which powder may be sifted. A cap 6 is fitted over the lower end of the casing 2, with its inturned edge 7 fitting into an annular groove provided by indenting the casing 2 as shown at 8. The cap 6 is rotatable on the casing 2 and is provided with radial slots 9 adapted to register with the slots 5 in one position of the cap. An indentation 10 is provided in the side of the cap to coöperate with a short groove 11 in the casing 2 to stop the rotation of the cap 6 in one direction when the slots 9 register with the slots 5 and in the other direction when the slots 9 are moved out of registry with the slots 5 as shown in Fig. 3. O is an air hole.

A partition 12 is provided in the casing 2 intermediate the open and closed ends of the casing and this partition is provided with a pair of struck-up prongs 13 adapted to hold a stick of shaving soap 14 when inserted into the open end of the casing 20 as shown in Figs. 1 and 4. An annular shoulder 15 is provided on the inside of the casing 2 immediately below the partition 12 by indenting the casing 2, and an indentation 16 is provided at one side of the casing 2 immediately above the partition. The partition 12 rests on the shoulder 15 and is prevented from being pulled out of the casing by the indentation 16. However, before the stick of soap 14 is inserted into the casing, the partition 12 may be removed from the casing by swinging its left-hand side (Fig. 1) upwardly about the right-hand edge, which is lodged behind the indentation 16 until the partition can be moved to the left from behind the indentation and thence out through the open end of the casing.

The compartment 47 formed in the lower end of casing 2 between the partition 12 and the closed end 4 is adapted to contain talcum powder. By virtue of the unique arrangement above described the compartment 47 may be filled with powder before the partition 12 is inserted into the casing 2 into the position shown in Fig. 1 after which the partition may be inserted into the casing by the reverse of the operations above described in removing the partition. After the partition is fitted in place a shaving stick 14, which preferably fits snugly in the open end of the casing 2, is inserted into the casing as shown in Figs. 1 and 4, the prongs 13 being forced into the soap as shown in Fig. 1. After the soap has been placed in the casing the partition 12 is locked in position inasmuch as the indentation 16 prevents the partition from being withdrawn straight upwardly and inasmuch as the soap prevents the partition from being tipped up about its right-hand edge as above described.

In the preferred embodiment of my invention illustrated in the drawings a shaving brush 17 is mounted in the upper end of the casing 1, the upper portion 18 of the casing being turned inwardly to secure the brush in the casing. In order to house the brush a third casing 19 is provided. The casing 19 is adapted to fit over the end of the casing 1 and is adapted to be held in position on the casing 1 by means of a sleeve 20 slidingly mounted on the casing 1. The casings 1 and 19 are respectively provided with an annular ridge 21 and an annular groove 22 adapted to interfit and prevent the casing 19 from being slipped off the end of the casing 1 while held in position by the sleeve 20. The casing 1 is also preferably provided with an annular ridge or shoulder 23 adapted to limit the downward movement of the sleeve 20 to a position which will just permit the casing 19 to be removed. The casing 19 is divided longitudinally into two parts 24 and 25 and the two parts are hinged together as illustrated at 26 in Fig. 5. The upper end of the casing 19 is preferably provided with ventilating openings 27 and the sides of the casing are also preferably provided with ventilating openings as illustrated at 28.

To remove the casing 19 from around the brush 17 the sleeve 20 is slipped downwardly from the position shown in Fig. 1 to the position shown in Fig. 4 and the casing 19 may then be removed either by sliding it off of the brush into the position shown in Fig. 4, or by opening the casing 19 as in Fig. 5 and removing the brush laterally through the opening. To place the casing 19 around the brush the casing is opened as shown in Fig. 5, the brush is then moved either laterally through the side opening of the casing or upwardly through the enlarged bottom opening of the casing, the casing 19 is closed around the casing 1 and brush 17 into the position shown in Fig. 1, and the sleeve 20 is then moved into the position shown in Fig. 1 to hold the casing 19 in position. In this way the difficulty of placing a shaving brush in a small tubular casing is overcome.

To open the set the casing 19 is removed from around the brush and the casing 2 is removed from the casing 1. The casing 2 serves as a handle for the shaving stick 14 and after shaving talcum powder may be sifted from the compartment 47 by rotating the cap 6 into position to open the slots in the end of the casing 2. After the powder or soap has become exhausted the partition 12 may be removed and a new supply of powder poured into the compartment 47 through the upper end of the casing 2 and a new stick of soap pressed on the prongs 13.

From the foregoing detailed description of the preferred embodiment of my invention it appears that by virtue of my invention a shaving set comprising a brush, a shaving stick, and a talcum powder container, may be incorporated into a single unitary device. It will also be understood that the sub-combination comprising the casing adapted to hold both a shaving stick and talcum powder may be employed independently, either with or without a casing such as casing 1, and that the sub-combination comprising the brush housing and associated parts may if desired be employed alone.

I claim:

1. A toilet article comprising a tubular case open at one end and substantially closed at the other end, and means for mounting a stick of shaving soap in the open end of the case in spaced relationship to the closed end so that talcum powder may be retained thereby in said closed end.

2. A toilet article comprising a tubular case open at one end, a second tubular case open at one end and closed at the other end, the open ends of the two cases being adapted to fit together, and a partition in said second case intermediate the ends of the case forming a compartment in each end of the case, the compartment in the open end of the case being adapted to hold a stick of soap and the compartment in the closed end of the case being adapted to contain powder.

3. A toilet article comprising a tubular case open at one end, a second tubular case open at one end and closed at the other end, the open ends of said cases being adapted to be detachably secured together, the open end of said second case presenting means to hold a stick of soap in spaced relationship to said closed end so as to form a compartment in the closed end adapted to contain powder.

4. A toilet article comprising a tubular case open at one end and substantially closed at the other end, a partition mounted in said case intermediate the ends of the case forming a compartment in each end of the case, and a prong struck up from said partition to secure a stick of shaving soap in the open end of said case, the opening formed by striking up said prong being closed by said soap so that powder may not leak from the closed end through the open end of said case when the soap is secured in said open end.

5. A toilet article comprising a tubular case open at one end, a second tubular case open at one end and closed at the other end, the open end of the second case being adapted to telescope into the open end of the first case with a snug sliding fit, the open end of the second case being adapted to have a stick of soap secured therein in spaced relationship to the closed end of said second case so as to form a compartment adapted to be filled with powder through the open end of the case before the soap is secured in place, and means for sifting powder from said compartment after the soap is secured in place.

6. A toilet article comprising a tubular case open at one end and closed at the other end, a partition mounted in said case intermediate the ends of the case so as to form a compartment in the closed end of the case adapted to hold powder, the partition being detachable to permit said compartment to be filled from the open end of the case, the open end of said case being arranged to hold a stick of soap therein, and the closed end of the case being arranged to sift powder from said compartment after a stick of soap has been mounted in the open end of the case.

7. A toilet article comprising a tubular case open at one end and closed at the other end, a partition mounted in said case intermediate the ends of the case so as to form a compartment in the closed end of the case adapted to hold powder, means for securing a stick of soap to said partition so as to project from the open end of the case, and a shoulder on said case overhanging said partition to hold the partition in the case when a stick of soap is secured to the partition and to permit the partition to be detached through the open end of the case when empty.

Signed by me at Boston, Mass., this ninth day of October, 1918.

SAMUIL ALLAND.